Oct. 17, 1944.   T. R. SMITH   2,360,733
FAUCET CONSTRUCTION
Filed Nov. 14, 1942
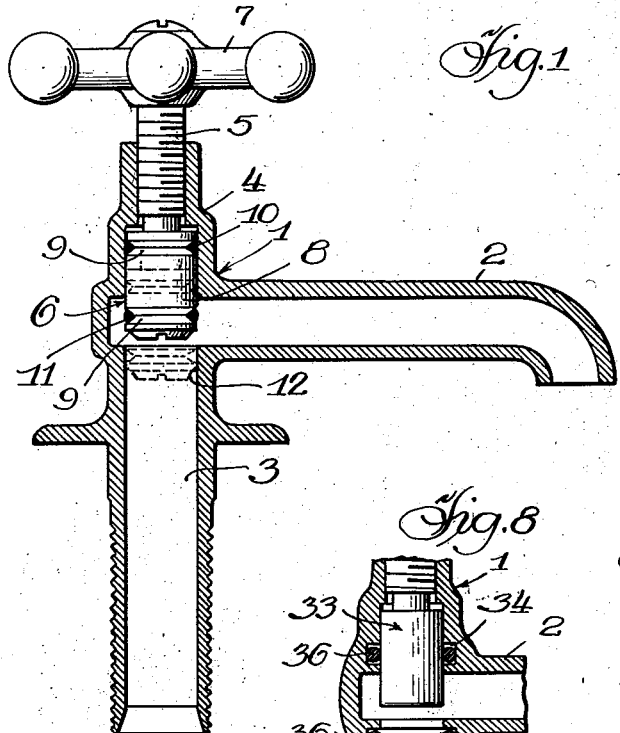
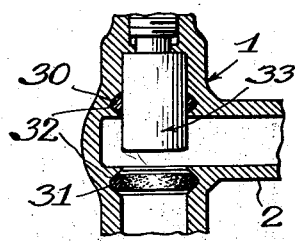
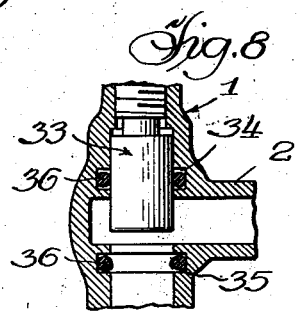
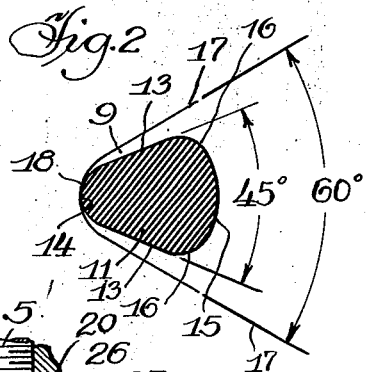
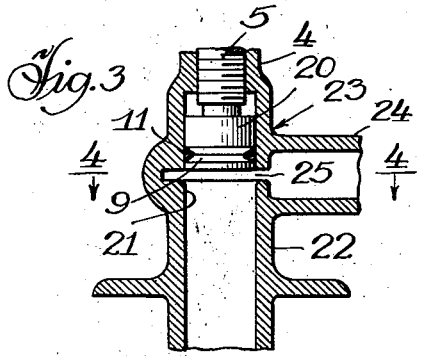
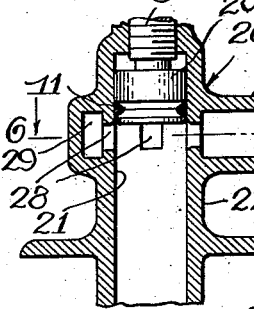
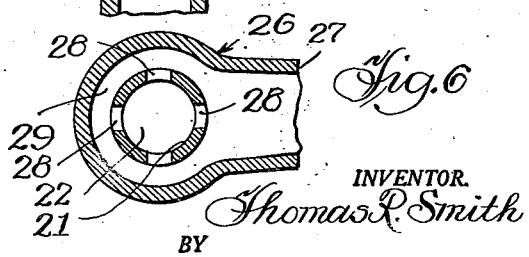
INVENTOR.
Thomas R. Smith
BY
Parkinson & Lane
Attys
Witness:
Chas R. Kursh Patented Oct. 17, 1944

2,360,733

UNITED STATES PATENT OFFICE 2,360,733

FAUCET CONSTRUCTION

Thomas R. Smith, Newton, Iowa, assignor to The Maytag Company, Newton, Iowa, a corporation of Delaware Application November 14, 1942, Serial No. 465,558

9 Claims. (Cl. 251—77)

The present invention relates to a faucet construction and more particularly to a novel valve having a wedge-type packing for sealing and stopping the flow of fluid such as water, when the port openings are closed.

The novel valve is so constructed that the seal will operate with equal efficiency at extremely high pressures or at low pressures such as are encountered in ordinary water systems. In fact, the novel packing will seal and maintain an effective seal at zero pressure. By reason of the present novel seal construction, it is impossible for the operator to place any undue pressure on the valve seat as can be done with ordinary types of washers in which this undue pressure results in considerable wear, crushing, or other damage to the seal and quickly permits leakage or drip of the water when the valve is in closed position.

A further object of the present construction is the provision of a novel valve assembly resulting in a faucet that is drip-proof. Once the valve carrying the packing is turned or moved past the orifice for discharge of the liquid, it may be turned or moved further without any additional pressure being exerted on the packing or sealing element and without any damage thereto.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in vertical cross section through a faucet equipped with the novel valve construction.

Figure 2 is a diagrammatic view showing the relationship between the packing or sealing element and the recess in which it is mounted.

Figure 3 is a fragmentary view in vertical cross section through an alternate form of valve assembly.

Figure 4 is a view in horizontal cross section taken on the line 4—4 of Figure 3.

Figure 5 is a view similar to Figure 3 but of a further alternate form of valve assembly.

Figure 6 is a view in horizontal cross section taken in a plane represented by the line 6—6 of Figure 5.

Figure 7 is a fragmentary view in vertical cross section through a faucet provided with an external type sealing element or packing mounted in the body of the faucet.

Figure 8 is a view similar to Figure 7 but showing an alternate form of external type packing.

Referring more particularly to the disclosure in Figures 1 and 2 of the drawing, the novel embodiment therein shown comprises a faucet formed with a faucet body 1 having a spout or nozzle 2 for discharge of the liquid entering through the intake 3. The body is provided with an upper extension 4 internally threaded to receive a threaded valve stem 5 provided with a valve assembly 6 at its lower end and a handle 7 at its upper end. By rotating the handle in the proper direction, the valve assembly 6 including the piston 8 formed or provided with spaced substantially V-shaped recesses 9 carrying substantially wedge-shaped packing rings 10 and 11, is lowered to seat the valve and lower packing ring 11 against the interior surface 12 of the intake as shown in dotted outline in Figure 1, or raised to unseat the valve and elevate the packing ring 11 to the position shown in full outline in Figure 1. These packing rings may be of any resilient material suitable for the purpose such as natural or synthetic rubber, with the upper packing 10 adapted to seal and prevent any leakage of water through the extension 4, and the lower packing 11 controlling the passage or leakage of water to the spout 2.

As shown more clearly in Figure 2, the packing or sealing element 11, as well as the sealing element 10, is of substantially wedge-shaped cross section with its opposite side walls 13 disposed at an angle of approximately 45°, and its vertex 14 and base or sealing surface 15 suitably rounded. The corners 16 of the base are likewise rounded to prevent the material of the packing at these corners from being extruded or pinched between the piston 8 and the adjacent surface 12 forming the valve seat, when the valve is moved to closed position. The opposite sides 17 of the substantially V-shaped recess 9 are disposed at an angle of approximately 60° so that when the packing is not under compression, its side walls 13 are spaced from the sides 17 of the recess. The base 18 of the recess 9 is curved upon a radius preferably greater than but approximately conforming to the radius of the vertex 14 to permit the latter to pivot within the recess.

Figures 3 and 4 disclose an alternate construction of valve in which the piston 20 is provided with a single packing or sealing element 11 mounted adjacent its lower end in a substantially V-shaped groove or recess 9. This packing or sealing element is adapted to seat against an interior surface 21 of the intake 22 in the faucet body 23. In this form of construction, the opening through the nozzle 24 connects with the intake 22 through a port comprising a continuous annular slit 25.

Figures 5 and 6 disclose a valve construction similar to that shown in Figures 3 and 4, but in which the faucet body 26 is provided with a spout or nozzle 27 connecting with the intake 22 through suitably spaced slots 28 opening into an annular port 29. As in Figure 3, a single packing or sealing element 11 is provided and this packing is adapted to seal against the seat or sealing surface 21 formed on the interior of the intake 22.

In Figure 7 there is disclosed a faucet 1 of the type shown in Figure 1, but in which the body of the faucet is provided with a pair of substantially V-shaped recesses 30 and 31 for receiving substantially wedge-shaped sealing rings or packings 32. The recess 30 is disposed above the discharge to the nozzle 2 where it seals against the piston 33 of the valve assembly to prevent escape or leakage of water therebeyond. In this form of the invention the sealing rings or packings are of the external type as distinguished from the internal type shown in the preceding figures, in that recess and packing are provided in the body of the faucet and the wedge-shaped packing is tapered outwardly and seals against the piston.

Figure 8 shows a faucet 1 having a pair of recesses disposed as in Figure 7, but with the recesses 34 and 35 of substantially channel-shape and adapted to receive sealing rings or packings 36 of circular cross section. The width of the grooves or recesses 34 and 35 is greater than the diameter or cross section of the sealing rings or packings to permit the latter to pivot or move laterally within their respective recesses to thereby form an effective seal against the body of the piston 33.

Having thus disclosed the invention, I claim:

1. In a water faucet having an intake and spout for discharge of the water, a valve assembly comprising a longitudinally movable member having a substantially V-shaped recess in its outer periphery, a resilient sealing element carried in the recess and having a cross sectional area substantially less than the recess and with the base of the recess and the adjacent surface of the sealing element rounded to permit lateral, pivotal movement of the element within the recess about the base but having a sealing surface projecting beyond the confine of the recess and periphery of the member, a valve seat provided on the interior of the intake, and means for longitudinally moving the member and sealing element in the faucet until the sealing element engages the valve seat and stops the flow of water to the spout.

2. In a water faucet having an intake pipe and nozzle for discharge of the water, a valve assembly comprising a longitudinally movable member having a substantially V-shaped recess in its outer periphery, a substantially wedge-shaped resilient sealing element carried in the recess and having a cross sectional area substantially less than the recess to permit lateral movement of the element within the recess but having a sealing surface projecting beyond the confine of the recess and periphery of the member, a valve seat provided on the interior of the intake pipe, a handle and valve stem for longitudinally moving the member and sealing element in the faucet until the sealing element engages the valve seat and stops the flow of water to the spout, the sealing element and valve seat being so constructed and arranged that undue pressure cannot be applied thereto.

3. In a water faucet, a valve assembly including a member having a substantially V-shaped recess and a resilient sealing element carried in the recess, the sealing element being of substantially wedge-shape with its vertex and base rounded and adapted to pivot in the recess about its vertex.

4. In a water faucet having a valve seat, a valve assembly comprising a longitudinally movable member having a substantially V-shaped recess, a substantially wedge-shaped packing formed of a flexible sealing material carried in the recess and having a part projecting beyond the recess adapted to seal against the seat, the base of the recess and the vertex of the packing having approximately the same contour but the sides of the recess being disposed at an angle greater than that defined by the sides of the packing to permit the packing to pivot about its vertex within the recess as it is moved to sealing position.

5. In a faucet construction, a valve assembly comprising a longitudinally movable piston, a substantially V-shaped recess provided in the periphery of the piston and with its opposite side walls disposed at an angle of approximately 60°, and a substantially wedge-shaped resilient packing having its opposite sides disposed at an angle of approximately 45° and mounted in and adapted to pivot within the recess about its vertex.

6. In a faucet construction, a valve assembly comprising a longitudinally movable piston, a substantially V-shaped recess provided in the circumference of the piston, and a substantially wedge-shaped resilient packing in the recess provided with a rounded sealing surface projecting beyond the circumference of the piston and adapted to engage the intake of the faucet and seal thereagainst.

7. In a faucet construction having a body member provided with an intake port and a discharge, a valve assembly including a member movable longitudinally within the body member for opening or closing the intake port, a V-shaped recess provided in one of the members and a substantially wedge-shaped packing carried in the recess free to pivot about its vertex and adapted to seat and seal against the other member when the longitudinally movable member is moved to closed position.

8. In a faucet construction having a body member provided with an intake port and a discharge spout, a valve assembly including a member movable longitudinally within the body member for opening or closing the intake port, a recess provided in one of the members with its opposite sides disposed to form an acute angle and a packing carried in the recess and adapted to seat and seal against the other member when the longitudinally movable member is moved to closed position, the opposite sides of the packing being disposed at an angle substantially less than the angle of the recess to permit the packing to pivot and shift laterally as sealing is accomplished.

9. In a faucet construction having a body member provided with an intake port and a discharge, a valve assembly including a member movable longitudinally within the body member for opening or closing the intake port, spaced substantially V-shaped recesses provided in one of the members, a sealing element positioned in each recess and adapted to seat and seal against the other member, the sealing elements being of substantially less cross section than that of their respective recesses but with the base of the recesses rounded and the opposite sides of the sealing elements normally spaced from the sides of the recesses to permit each to pivot within its recess and effect sealing under all operating conditions.

THOMAS R. SMITH.